United States Patent [19]
Reejhsinghani

[11] Patent Number: 5,238,994
[45] Date of Patent: Aug. 24, 1993

[54] FORMING POLYVINYL BUTYRAL

[75] Inventor: Nandlal S. Reejhsinghani, Longmeadow, Mass.

[73] Assignee: Monsanto Company, St. Louis, Mo.

[21] Appl. No.: 756,958

[22] Filed: Sep. 9, 1991

[51] Int. Cl.$^5$ .................. C08L 29/04; C08L 61/00; C08K 5/07; C08F 261/04

[52] U.S. Cl. .................................... 525/57; 525/61; 525/298; 525/301; 525/154

[58] Field of Search ............... 524/300, 315, 522, 523, 524/502; 525/61, 57, 298, 301, 154

[56] References Cited

U.S. PATENT DOCUMENTS 2,345,946  4/1944  Overbaugh.
4,205,146  5/1980  Hermann et al..
4,533,697  7/1985  Degeilh.
4,751,266  6/1988  Hermann et al..

OTHER PUBLICATIONS

Research Disclosure, Oct. 1984, No. 24624, p. 497.

Primary Examiner—James J. Seidleck
Assistant Examiner—W. R. H. Clark
Attorney, Agent, or Firm—Michael J. Murphy; Mark F. Wachter

[57] ABSTRACT

A process for improving the size distribution of granules formed during synthesis of polyvinyl butyral which involves delaying addition of surfactant to the reaction medium in which the polyvinyl butyral is being formed until after gel break. The surfactant is usually polyacrylic acid or a copolymer of acrylic acid with up to 20 weight percent of one or more copolymerized monomers, in an amount effective to counteract excessive agglomeration of the polyvinyl butyral granules.

17 Claims, No Drawings

FORMING POLYVINYL BUTYRAL

BACKGROUND OF THE INVENTION

This invention relates to polyvinyl butyral and more particularly to improvements in processes for synthesizing polyvinyl butyral.

Polyvinyl butyral polymer or resin is used in sheeting with glass for laminated glazings, in specialty surface coatings and as binders for paper coatings, toners and the like. Polyvinyl butyral compositions in these applications contain about 10 to about 30% by weight functional hydroxyl groups with the remainder being essentially vinyl butyral (hereinafter "PVB").

It is known to prepare PVB by reacting polyvinyl alcohol (PVOH) and butyraldehyde, usually in an aqueous medium under acidic conditions. This acetal reaction is initiated in the homogeneous phase at relatively low temperatures. When a certain amount of the hydroxyl groups of the PVOH are reacted with the butyraldehyde, PVB polymer precipitates out. The reaction is then completed in the heterogenous phase at elevated temperature. The PVB particles formed tend to agglomerate into clusters which cause reactor wall scale buildup. Leverages for particle or granule (clusters of particles) size control are agitation and reaction temperature during the homogeneous phase. There are practical limits, however, on the temperature range for the homogeneous phase of the reaction. Besides high viscosity, too low temperature undesirably adversely affects polymer properties. Reaction temperature above about 25° C. causes reactor fouling and results in very coarse granule size. High agitator speeds are impractical in large size commercial reactors. As a result, significant PVB polymer (typically on the order of about 1-3% by weight) is conventionally discarded as oversize, off-grade material in commercial PVB manufacturing operations.

It is likewise known to use additives for various purposes during PVB synthesis, which additives are variously referred to in the prior art as emulsifying or dispersing or suspending agents or surfactants (hereinafter interchangeably referred to as "surfactants"). U.S. Pat. No. 2,345,946 is typical in disclosing dispersing agents in the acetalization process for preparing PVB to prevent excess agglomeration of PVB particles.

SUMMARY OF THE INVENTION

Now further improvements have been made in controlling granule size during synthesis of PVB.

Accordingly, a principal object of this invention is to provide improvements in the process of manufacturing PVB resin.

Another object is to reduce the amount of unwanted oversized granules formed in the PVB synthesis process.

A specific object is to provide an industrially valuable process step in the production of PVB resin by aqueous acetalization.

Other objects will in part be obvious and will in part appear from the following description and claims.

These and other objects are accomplished by delaying addition of surfactant to the PVOH-butyraldehyde condensation reaction until a particular point is reached in the acetalization reaction, which is after gel break (hereinafter defined) but before the elevated temperature is reached at which the final stage of the PVOH-butyraldehyde acetalization reaction occurs. This procedure rather dramatically significantly reduces the amount of oversize product produced.

In a more specific aspect, a process is provided for improving the size distribution of granules formed during synthesis of PVB which comprises adding after gel break to the reaction medium in which the polyvinyl butyral is being formed, polyacrylic acid or a copolymer of acrylic acid with up to 20 weight percent of one or more copolymerized monomers, in an amount effective to counteract excessive agglomeration of polyvinyl butyral particles. Addition of the surfactant preferably occurs after a finite interval following gel break during which interval the PVB particles formed at gel break are desirably partially agglomerating.

DETAILED DESCRIPTION OF THE INVENTION

According to the invention, surfactant is used for improved size control of PVB granules forming during a specific stage of the aqueous condensation acetalization reaction of PVOH with butyraldehyde. The initial PVOH-butyraldehyde reaction, generally in an aqueous medium in the presence of an acid catalyst, is maintained at about 10° to about 25° C. with vigorous agitation until PVB precipitation occurs. This change from an initial homogeneous phase to a heterogeneous phase is referred to herein as "gel break". An essential aspect of the invention involves conducting the initial homogeneous phase of the reaction in the absence of surfactant and then adding surfactant to the reaction medium after gel break during the heterogeneous phase and before the temperature of the reaction reaches the elevated temperature at which the acetalization reaction is continued to the desired end point. As will be shown, the surfactant is not an effective product size control enhancement additive when present initially during the homogeneous phase of the reaction. During conventional polymer recovery steps subsequent to reaction completion which involve washing and neutralizing the product formed, the bulk of the surfactant is removed from the polymer granules. The resulting PVB polymer is equal or better in optical properties as determined by haze measurements as compared to a control without surfactant.

The surfactant is optimally added to the acetalization reaction medium after elapse of a finite time interval subsequent to gel break during which the precipitated PVB condensant is partially agglomerating in the absence of surfactant. During this phase, the particles which have just precipitated are relatively soft and prone to agglomerate into clusters and any surfactant present tends to be irremovably entrapped or entangled within the still-small but developing particle clusters, which entrapment can lead to color and haze in the final product. To avoid this it is desirable to delay surfactant addition but not for so long that too much agglomeration occurs since then the desired size control result is foregone. Generally good size control is achieved when surfactant addition occurs after gel break while the reaction temperature is within the range of about the gel break temperature (on the low side) up to about 80° C., preferably 30° C. on the high side, the latter temperatures occurring after heat has been applied to the reaction medium but before the temperature is reached at which the final heterogeneous phase of the reaction is carried out. Assuming heating commences shortly after completion of gel break by, for example, direct injection of steam into the batch, which heat-up schedule is preferred for optimally, minimizing cycles, this means surfactant addition generally occurs on the order of about 5 to about 45, preferably 20 to 30 min. after completion of gel break. Assuming such heat-up procedure, the level of unreacted PVOH when surfactant addition occurs after elapse of such preferred 20-30 min. is usually at least 35 weight percent and often about 35-40 weight percent of the original PVOH.

The surfactant employed in the invention can vary depending on the details of the specific acetalization reaction and formulation. Preferred surfactants are polymeric polyacrylic acid homopolymers or copolymers of acrylic acid with up to 20 weight % of one or more copolymerized polymers. Usable copolymerizable monomers are methacrylic acid, 2-ethylhexylacrylate and the like.

The amount of surfactant can likewise vary as long as it is effective to counteract excess agglomeration of the PVB granules and does not result in excess color in the PVB product. Generally the surfactant concentration will be between 0.005 and 1 weight %, preferably 0.075 to 0.5 weight % and most preferably 0.1 to 0.2 weight % based on the weight of the PVOH.

Usable PVOH (either a single grade or two or more blended grades) are commercially available for example from Air Products and Chemicals Inc. or E.I. duPont deNemours & Company, Inc. They are characterized by a degree of polymerization (DP) of about 500 to 2500.

The invention is further described in the following Examples which are for illustration only and not to limit or restrict the invention. Amounts and percentages expressed are by weight.

The following tests were used to obtain results tabulated in the Examples.

Laminate haze—determined by comparing the amount of scattered light from a sample of 0.20 inch (0.5 cm) thick PVB laminated between two 0.1 inch (0.25 cm) thick sheets of clear glass with that from 0.2 inch (0.51 cm) glass sheets. Measurements were made on a Hunter Lab Model D25 Colorimeter.

Laminate color—The laminate samples prepared for the haze test above were analyzed for color measurement using a Hunter Colorimeter Model D25. The instrument was standardized with blank glass sheets.

EXAMPLES 1-7

Examples 1 (no surfactant) 2 (surfactant present throughout entire reaction) and 4 (surfactant concentration too high) are controls not according to the invention. Examples 3 and 5-7 are according to the invention.

The following raw material charges were prepared:
A) PVOH Varnish

90/10, medium/low molecular weight PVOH blend was dissolved in water to provide an 8.9% solution. The medium molecular weight PVOH had a solution viscosity of 29 cps (0.029 Pa.s) and the low molecular weight 5 cps (0.005 Pa.s) (4% water solution, 20° C).

B) Varnish Charge 3539 gm of PVOH varnish containing 303.3 gm 100% PVOH

| C) Butyraldehyde Premix Charge | |
|---|---|
| butyraldehyde | 188 gm |
| glutaraldehyde | 4.5 gm (1% water solution) |
| D) Acid Catalyst Charge | |
| I. Nitric acid (35% concentration) | 21.2 gm |
| Dilution water | 14.7 gm |
| II. Nitric acid (35% concentration) | 63.6 gm |
| Dilution water | 29.5 gm |

E) Surfactant Charge

Surfactant was dissolved in water; concentrations appear in the Table following.

The varnish charge and butyraldehyde premix charge were added to a five liter fluted spherical glass reactor equipped with a turbine agitator turning at a tip speed of about 700 ft/min (238 m/min) which vigorously mixed the reactor contents throughout the reaction. The reactor contents were cooled to about 22° C. in a water bath and nitric acid I added. Gel break at 22° C. occurred about 17 min. after nitric acid I charge. After gel break was complete (within a fraction of a minute) nitric acid II was added. Five minutes was allowed to lapse while maintaining the reaction at 22° C. and then a water solution of surfactant (details below) was added (except Ex. 2 where it was added at the start). The batch was then heated to above 80° C., i.e. to 87° C. and held at this temperature for four hours to complete the acetalization reaction. The batch was then washed with hot water until the pH dropped to about 4.0. The batch was then neutralized with dilute potassium hydroxide to bring the pH to 10.0 and then held at 80°-85° C. for one hour. The batch was then washed again to remove excess KOH to a pH of 7.0-7.5. The slurry was dewatered and dried overnight in an oven at about 50° C. Data on polymer evaluation is as follows:

| | EXAMPLE | | | | | | |
|---|---|---|---|---|---|---|---|
| | 1 | 2 | 3 | 4 | 5 | 6 | 7 |
| Surfactant | None | PAA[1] | PAA[1] | PAA[2] | PAA[2] | PDR-14[3] | Methacrylic acid[4] |
| Surfactant Concentration (% based on PVOH) | — | 0.2 | 0.2 | 1.8 | 0.2 | 0.2 | 0.2 |
| PVB resin | | | | | | | |
| % PVOH | 19.2 | 19.8 | 19.7 | 19.8 | 19.7 | 19.6 | 20.6 |
| Laminate Color | 4.7 | 59 | 8.3 | 66.5 | 1.8 | 80.2 | 3.6 |
| Laminate Haze | 10.9 | 10.1 | 12.2 | 16.9 | 10.4 | 11.1 | 8.4 |
| Sieve Analysis[5] (% retained on screen no.) | | | | | | | |
| 10 | 85.1 | 20.0 | 4.3 | 4.4 | 4.6 | 2.8 | 6.5 |
| 16 | 12.7 | 42.6 | 3.9 | 9.0 | 8.1 | 19.5 | 24.2 |
| 20 | 1.6 | 28 | 5.3 | 10.3 | 9.4 | 17.5 | 35 |

-continued

| | EXAMPLE | | | | | | |
|---|---|---|---|---|---|---|---|
| | 1 | 2 | 3 | 4 | 5 | 6 | 7 |
| 30 | 0.3 | 9 | 7.1 | 16.5 | 12.4 | 9.6 | 28.2 |
| 40 | 0.2 | 0.4 | 23.8 | 38.5 | 47.7 | 9.6 | 5 |
| 50 | 0.1 | 0 | 47.2 | 16.5 | 16.1 | 24 | 0.1 |
| 100 | 0 | 0 | 8.2 | 4.3 | 1.4 | 17 | 1 |
| 140 | 0 | 0 | 0.1 | 0.4 | 0.1 | 0 | 0 |
| 200 | 0 | 0 | 0.1 | 0.1 | 0.1 | 0 | 0 |
| Pan | 0 | 0 | 0 | 0 | 0.1 | 0 | 0 |

[1] Acumer ™ 1530 from Rohm and Haas, mol., wt. = 190,000.
[2] Acumer ™ 1510 from Rohm and Haas, mol. wt - 60,000.
[3] 90/10 copolymer of acrylic acid/2-ethylhexylacrylate
[4] Acrysol ® A-41 from Rohm & Haas - believed to be a copolymer of acrylic acid and methacrylic acid.
[5] U.S. Sieve Series The above results show that when surfactant is added after 22° C. gel break (Exs. 3 and 5-7) the PVB formed is of a size substantially free of granules retained on a number ten screen—i.e. less than 10% and, with polyacrylic acid homopolymer as the surfactant, less than 5% (Exs. 3 and 5). This compares with the 20% retained on a no. 10 screen in Ex. 2 when the surfactant was present throughout the entire reaction including before gel break. At lower gel break temperatures (e.g. 10°-15° C.) the amounts retained on no. 10 screen are predicted to be even lower than for Examples 3, 5-7 shown above.

Moreover, the data shows that when the preferred polyacrylic acid surfactant is used (Exs. 3, 5, 6) according to the invention, a significant quantity (at least 50%) of granules pass through a number thirty screen and are retained on a number one hundred screen. For example, in Ex. 3, cumulative amount passing through no. 30 screen was 100 minus 20.6=79.6% and the amount retained on a number 100 screen was 100 minus 0.2=99.8%. This is a preferred distribution intermediate the relatively large and very small size range. When significant product is very small in size, filters associated with dewatering prematurely plug requiring back-washing which undesirably extends cycles. On the other hand, though granules may be smaller than number 10 screen, they nevertheless may be sufficiently coarse to appear as optical defects (called hard spots) in sheet formed from such product. If this occurs, such granules (for example passing through no. 10 but retained on no. 30 screen) are usually isolated, crushed and recycled which also undesirably complicates manufacturing.

EXAMPLES 8-25

These Examples examine the effect on properties of the time of surfactant addition after gel break at temperature. "Pre" below means surfactant was present before gel break; "post" means surfactant was added after gel break; "GB" means gel break. For brevity regarding granule screen analysis, only % retained on number 10 screen is provided. Surfactant concentrations were 0.2 wt. % based on PVOH charge. "PAA" means polyacrylic acid.

The procedure of Example 3 was repeated with the following results.

| Ex. | Surfactant | Pre/Post Add | GB Temp °C. | Add Temp °C. | Add Time min. | Lam. Color | Lam. Haze | % on no. 10 Screen |
|---|---|---|---|---|---|---|---|---|
| 8 | none | — | 22.7 | — | — | 4.7 | 10.9 | 85.1 |
| 9 | none | — | 13 | — | — | 2.9 | 3.8 | 16 |
| 10 | none | — | 14 | — | — | 5.4 | 7.1 | 13 |
| 11 | PAA[1] | Pre | 22 | — | — | 59 | 10.1 | 20 |
| 12 | " | Post | 14 | 14 | 5 | 5.5 | 9.4 | 14.7 |
| 13 | " | " | 13.5 | 40 | 19 | 3.0 | 4.7 | 9.7 |
| 14 | " | " | 22 | 22 | 5 | 8.3 | 12.2 | 4.3 |
| 15 | " | " | 22 | 36 | 20 | 6.7 | 9.5 | 5.2 |
| 16 | " | " | 22.5 | 75 | 47 | 15.9 | 10.1 | 36.6 |
| 17 | PAA[2] | Pre | 22 | — | — | 54.4 | 5.4 | 33 |
| 18 | " | Post | 14 | 14 | 5 | 3.9 | 7.1 | 4.6 |
| 19 | " | " | 14 | 40 | 27 | 7.3 | 31.5 | 8.9 |
| 20 | " | " | 22 | 22 | 5 | 1.8 | 10.4 | 4.6 |
| 21 | " | " | 22 | 40 | 20 | 7.2 | 8.7 | 9.6 |
| 22 | " | " | 22.7 | 80 | 45 | 7.4 | 4.6 | 5.8 |
| 23 | PDR-14[3] | Post | 14 | 14 | 5 | 4.4 | 8.1 | — |
| 24 | " | " | 14 | 40 | 28 | 5.1 | 9.7 | 0 |
| 25 | " | " | 22 | 41 | 20 | 40.7 | 11.0 | 10.4 |

[1] Acumer ™ 1530 from Rohm and Haas, mol., wt. = 190,000.
[2] Acumer ™ 1510 from Rohm and Haas, mol. wt = 60,000.
[3] 90/10 copolymer of acrylic acid/2-ethylhexylacrylate The above data shows that favorable results can be obtained by adding the surfactant after gel break either while at gel break temperature or during heating when the batch is being brought to elevated temperature for the final phase of the acetalization reaction. Thus, Exs. 13, 15, 19, 21 & 22 show acceptable laminate color, haze and size control (<10% on no. 10 screen) when some agglomeration occurs after gel break by delaying surfactant addition until after heating has commenced. On the other hand, addition after reaching too high a temperature allows excessive agglomeration to occur resulting in substantial oversize granules (>10% on no. 10 screen) (Ex. 16). Generally, under comparable surfactant add conditions, oversize (% retained on no. 10 screen) will be reduced as gel break temperature is lowered.

The preceding description is for illustration only and is not to be taken in a limited sense. Various modifications and alterations will be readily suggested to persons skilled in the art. It is intended, therefore, that the foregoing be considered exemplary only and that the scope of the invention be ascertained from the scope of the following claims.

I claim:

1. In the process of producing polyvinyl butyral by acetalizing polyvinyl alcohol with butyraldehyde in an aqueous reaction medium in the presence of a catalyst, the steps in combination therewith of:
   i) adding surfactant to the reaction medium after gel break when the reaction medium contains at least 35 weight percent unreacted polyvinyl alcohol;
   ii) increasing the temperature of the reaction medium to above 80° C.; and
   iii) continuing the acetalization reaction between polyvinyl alcohol and butyraldehyde until the reaction end point is reached.

2. The process of claim 1 wherein the reaction medium contains about 35 to 40 weight percent unreacted polyvinyl alcohol when step i) occurs.

3. The process of claim 1 including the step of partially agglomerating polyvinyl butyral particles formed at gel break before step i) occurs.

4. The process of claim 3 wherein the temperature of the reaction medium at gel break is from about 10° to about 25° C.

5. The process of any of claims 1, 3 or 11 wherein addition occurs after passage of a predetermined period of time on the order of about 5 to 45 minutes subsequent to gel break.

6. The process of claim 5 wherein addition occurs during step ii).

7. A process for producing polyvinyl butyral which comprises, in combination, the steps of:
   i) acetalizing polyvinyl alcohol with butyraldehyde at a temperature of about 10° to about 25° C. in an aqueous acidic solution in the absence of surfactant until gel break occurs;
   ii) partially agglomerating polyvinyl butyral particles precipitating out of solution at gel break;
   iii) adding polyacrylic acid or a copolymer of acrylic acid with up to 20 weight percent of one or more copolymerized monomers in an amount effective to counteract further agglomeration of the polyvinyl butyral particles; and then
   iv) continuing acetalization of the polyvinyl alcohol with butyraldehyde at a temperature greater than about 80° C. until the desired reaction end point is reached;
   whereby the polyvinyl butyral formed is substantially free of granules retained on a ten mesh screen.

8. The process of claim 7 wherein step iii) occurs during heating of the reaction medium up to said temperature greater than about 80° C.

9. In the process of providing polyvinyl butyral by acetalizing polyvinyl alcohol with butyraldehyde in an aqueous medium in the presence of an acid catalyst and surfactant, the improvement which comprises delaying addition of the surfactant to the aqueous medium until after passage of a finite period of time on the order of about 5 to about 45 minutes after gel break.

10. The process of claim 9 wherein addition occurs during heating of the aqueous medium to the temperature at which the final phase of the acetalization reaction will occur.

11. The process of claim 10 wherein addition occurs before or at the point when the temperature of the aqueous medium reaches 80° C.

12. The process of claim 9 wherein the polyvinyl butyral formed is of a size substantially free of granules retainable on a number ten screen.

13. The process of claim 12 wherein less than about 10 weight percent of the polyvinyl butyral formed is of a size retainable on a number ten screen.

14. The process of claim 13 wherein granules retainable on a number ten screen comprise less than five weight percent.

15. The process of any of claims 9, 12, 13 or 14 wherein in a screen analysis of the polyvinyl butyral formed, at least fifty weight percent of granules retained on screens pass through a number thirty screen and are retained on a number one hundred screen.

16. The process of claim 15 wherein polyacrylic acid is added to the reaction medium.

17. The process of claim 16 wherein the polyvinyl butyral particles partially agglomerate during the finite period.

* * * * *